April 20, 1971 E. I. GORDON 3,575,823

METHOD OF MAKING A SILICON TARGET FOR IMAGE STORAGE TUBE

Filed July 26, 1968

INVENTOR
E. I. GORDON
BY
[signature]
ATTORNEY

United States Patent Office 3,575,823
Patented Apr. 20, 1971

3,575,823

METHOD OF MAKING A SILICON TARGET FOR IMAGE STORAGE TUBE

Eugene I. Gordon, Convent Station, N.J., assignor to Bell Telephone Laboratories, Incorporated, Murray Hill and Berkeley Heights, N.J.

Filed July 26, 1968, Ser. No. 747,866
Int. Cl. B44d *1/18;* C23b *5/48*
U.S. Cl. 204—15 1 Claim

ABSTRACT OF THE DISCLOSURE

The specification describes a technique for improving the diode-array image storage tube described in application Ser. No. 605,715 and now Pat. No. 3,403,284. Conductive islands are deposited over each diode to minimize adverse charge storage effects on the insulator isolating the diodes. Precise registration of the island on the diode regions is obtained by selective preferential deposition on the realtively conductive diode regions. This can be done by electrodeposition or electroless plating.

This invention relates to electron tubes for storing optical information.

The recently discovered image storage tube described in U.S. patent application Ser. No. 605,715 filed Dec. 29, 1966, by T. M. Buck, M. H. Crowell and E. I. Gordon and assigned to the assignee of this application, Bell Telephone Laboratories, Incorporated, and now Pat. No. 3,403,284, has received considerable attention and appears to be destined for considerable commercial use. It basically relies on a semiconductor target structure employing a monolithic array of diode storage elements. A typical structure consists of a silicon wafer which has been thermally oxidized, then subjected to a standard photolithographic treatment, followed by appropriate diffusions through the thermally grown $SiO_2$ mask to produce a large array of p-n junctions on one face. The $SiO_2$ mask also provides the necessary isolation of the substrate from the scanning electron beam.

This structure by itself is not completely satisfactory. As the electron beam scans over the highly resistive $SiO_2$ layer the surface of the $SiO_2$ exhibits spurious charging effects. Usually it will charge down to cathode potential or below. It can act as a negative grid relative to the p-island and prevent or inhibit beam electrons from landing on the p-island. If this happens the camera tube performance deteriorates or the tube can even fail to operate.

To avoid the charging problem, two alternatives have been used. The first and most often used is the resistive sea which is a thin resistive film covering the entire surface. This allows control of the surface potential with reasonable time constants. The second alternative is the conducting island which is a square hat formed over each p-island and the adjoining oxide. To date the conducting islands have been formed photolithographically by evaporating gold or silicon over the entire array and then using a photoresist to form an etching mask to remove a very fine, square grid of the conducting film, leaving a conducting square island centered on each p-island. Devices incorporating these features are described and claimed in the application mentioned above and in U.S. application Ser. No. 641,257 filed May 25, 1967, by M. H. Crowell, J. V. Dalton, E. I. Gordon and E. F. Labuda which is now Pat. No. 3,451,449 and assigned to the assignee of this application.

The islands increase the diode capacity to some extent (which may be a disadvantage) but they also greatly increase the effective beam landing area, reducing the required scanning beam current. If the stripes between the islands are narrow enough, charging of the oxide can be reduced to a negligible level. Because of step-and-repeat difficulties, re-registration has been a major difficulty in fabricating devices having arrays of conducting islands. Where effective registration has been obtained, gold islands have behaved as expected. However, the presence of pinholes in the oxide is now critical since the metal island presents a large area contact for the beam to the substrate through the pinholes. Also, the extra processing contributes to the cost of the target.

According to the invention the conducting islands are formed by a simple electrolytic technique which is low cost, puts the islands exactly on the diodes without requiring registration, and increases the beam landing area greatly without adding significantly to the diode capacity. In effect by electroplating gold or nickel or other appropriate conductors on the array side of the target the metal will plate only on the diode p-island. The plating current flows through the diodes under forward bias conditions which is a critical feature of the invention.

These and other aspects of the invention perhaps will become evident from the following detailed description.

Figure 1:
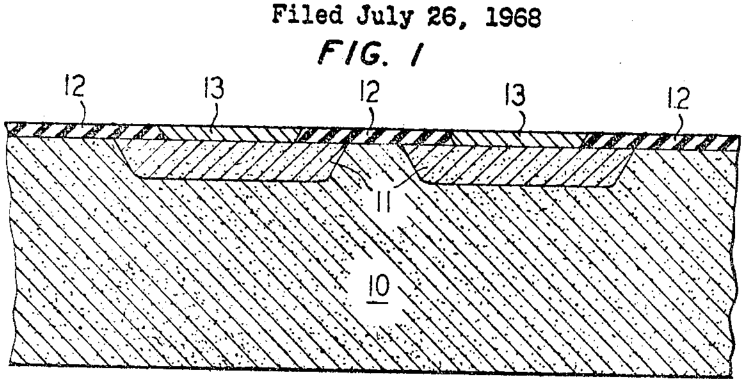
FIG. 1 is a front sectional view of a portion of a target made in accordance with the invention.

The basic target structure produced according to the teachings of the prior application referred to above consists of an n-type semiconductor substrate 10 having an array of impurity regions 11 diffused into one surface forming a multiplicity of p-n junctions. The junctions act as charge storage elements. The insulating film 12 covers the upper surface, except for the openings (ordinarily circular) over the diffused regions, to insulate the scanning electron beam (not shown) from the semiconductor substrate 10. In accordance with the present invention the metal islands 13 are then deposited on the regions exposed through the insulator 12 by one of the following methods.

A metal such as gold, nickel, cobalt, palladium, platinum, etc. is electroplated directly onto the regions exposed in the insulating layer 13. (The rarer platinum group metals rhodium, osmium, iridium and ruthenium are other possible choices). Silver and copper are obvious alternatives but silver tends to migrate. Copper diffuses into the common semiconductors and its presence is generally found to be undesirable in semiconductor devices. The following specific embodiment is given to illustrate this aspect of the invention.

A silicon target having a 10 ohm-cm. (n-type) base region and a hexagonal array of diodes formed by boron diffuser regions $8\mu$ in circumference on $15\mu$ centers (defined by a silicon dioxide insulating film) was cleaned in HF and immersed in a gold cyanide electroplating bath. The bath consisted of 21.3 grams per liter of $KAu(CN)_2$ and 50 grams per liter of $(NH_4)_2HC_6H_5O_7$. The bath was maintained at 65° C. The target was made cathodic and the current density was adjusted to 4 ma./cm.$^2$ of exposed silicon. After plating for one hour a gold layer 6–8 microns thick covered each diode region.

This example is exemplary of several procedures useful for achieving the objective of the invention namely, to obtain a conductive metal film in exact registration over each diode storage element. Whereas in the foregoing example the metal film is gold, the particular metal is not critical to the invention and it is obviously within the skill of the art to specify an appropriate electrolyte and anode for obtaining the desired deposit.

As an alternative to electrodepositing the metal islands, electroless plating has been found to be especially effective. Using this technique a uniform deposit of metal can be obtained over the exposed semiconductor with essentially no deposit on the insulating regions. Nickel, cobalt, and platinum are especially suitable for electroless deposition for this purpose. Electroless nickel plating baths are well known. An especially effective electroless cobalt solution is described and claimed in U.S. Pat. No. 3,306,830 issued to G. Gittrich and R. A. Ehrhardt on Feb. 28, 1967. The technique for depositing onto the target structure of this invention is straightforward, requiring only precleaning (e.g., in HF) and immersion in the electroless solution.

The thickness of the deposit in each of the above cases will depend largely on the structure desired. A minimum thickness of approximately 300 A. is adequate.

Figure 2:
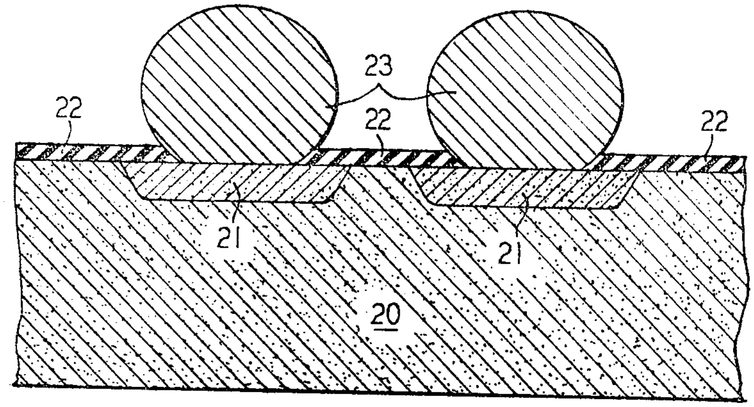
FIG. 2 is a view similar to that of FIG. 1 showing an alternative embodiment.

A further embodiment is shown in FIG. 2 in which each of the elements 20–23 correspond to elements 10–13 respectively of FIG. 1. In this case deposition is allowed to proceed past the point required to form the structure of FIG. 1. As the thickness increases the layer will begin to assume the shape appearing in FIG. 2. This shape can be encouraged in the case of the electrodeposited layer by effectively increasing the "throwing-power" of the electrolyte. Mechanisms for enhancing this characteristic of plating solutions are well known. As the deposit grows it effectively shields a greater portion of the insulator from the electron beam thereby further minimizing the charge accumulation effects. An added advantage of the apparently oversized islands is that the beam landing area is increased. The film capacity in series with the diode is also increased. Both of these are known to be desirable factors in the design of target arrays.

Figure 3:
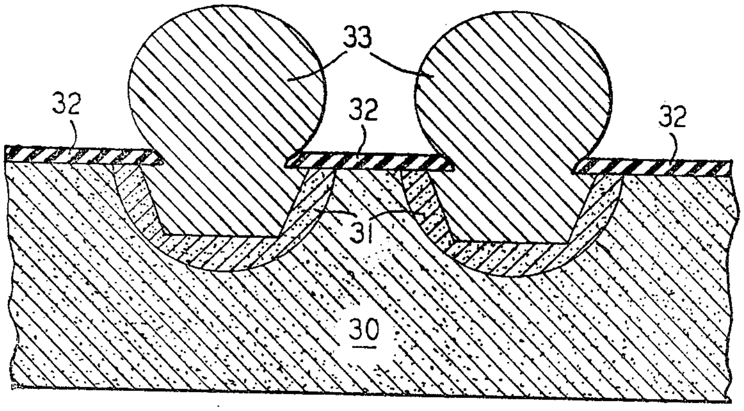
FIG. 3 is a view similar to that of FIG. 1 showing another alternative embodiment.

An alternative structural embodiment is shown in FIG. 3. The elements 30–33 correspond with elements 10–13, respectively, of FIG. 1. Here the diffused regions have been partly etched out by standard photolithographic techniques and the metal islands deposited within as well as on the substrate. This embodiment has two added virtues. The arrangement is structurally sound since the overlays are anchored within the substrate and the space charge region is brought closer to the back (bottom) surface of the target resulting in increased camera resolution.

The invention has been described in conjunction with an array of diodes formed by p-n junctions as this is the form of the device now receiving most attention. However, it is well known that junction devices can be made using MIS structures and such a device is described and claimed in U.S. patent application Ser. No. 732,273 filed May 27, 1968, by M. G. Bodmer, M.H. Crowell, E.I. Gordon and F. J. Morris and assigned to the assignee of this application which is now Pat. No. 3,523,208. It is also known that a rectifying barrier may accompany certain metal-semiconductor contacts as in Schottky-barrier devices. For the purposes of the invention it is only essential that a rectifying barrier be obtainable in the semiconductor substrate. The use of the term "barrier layer" or "barrier junction" is intended to generically describe this condition.

What is claimed is:

1. A method for making an improved diode-array target for an image storage tube which method comprises the steps of forming an insulating coating on an n-type semiconductor substrate, etching the insulating coating to expose selected portions of the substrate in a hexagonal array corresponding to the diode array, etching indented regions into the exposed portions of the substrate, diffusing a p-type impurity into the indented regions of the substrate to form the diode array, and depositing by electrolytic or electroless deposition a conductive metal layer in the indented regions with a thickness that protrudes beyond the insulating coating.

References Cited

UNITED STATES PATENTS

| | | | |
|---|---|---|---|
| 2,980,594 | 4/1961 | Pankove | 204—15 |
| 3,000,797 | 9/1961 | Gilman | 204—15 |
| 3,324,015 | 6/1967 | Saia et al. | 204—15 |

TA-HSUNG TUNG, Primary Examiner

T. TUFARIELLO, Assistant Examiner

U.S. Cl. X.R.

117—212